Patented Mar. 23, 1948　　　　　　　　　　　　　　　　　　　2,438,478

UNITED STATES PATENT OFFICE 2,438,478

METHOD OF PREPARING SILICONES AND PRODUCT THEREOF

James Franklin Hyde, Corning, N. Y., assignor to Corning Glass Works, Corning, N. Y., a corporation of New York No Drawing. Application February 26, 1942, Serial No. 432,529

3 Claims. (Cl. 260—448.2)

This invention relates to the preparation and use of the organic compounds of silicon which are known as the silicones, more particularly the lower alkyl silicones, dimethyl, diethyl, dipropyl, dibutyl, and diamyl, etc. In the chemical literature the term "silicone" refers to those silicon compounds, analogous to the ketones, in which two organic groups and oxygen are combined with silicon according to the general formula $R_2SiO$, R being an organic radicle. In other words silicones are di-organo substituted silicon oxides. Inasmuch as silicon, unlike carbon, does not form a stable double bond with oxygen, the silicones in general are polymeric and the unit structure is

As used herein, the term "silicone" excludes the mono-organo substituted oxides of silicon which are also polymeric and are represented by the unit structure

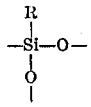

As a further distinction over instances where "methyl silicone" is used to include the mono-substituted compound, the term "dimethyl silicone" will be used herein to designate the compound $(CH_3)_2SiO$ having the polymeric unit structure

Likewise the terms "diethyl silicone," "dipropyl silicone," "dibutyl silicone," "diamyl silicone," etc., herein refer only to the corresponding oxides and unit structures containing the corresponding lower alkyl radicle, in place of the methyl radicle.

An object of this invention is to produce pure dialkyl silicones.

Another object is to prepare dialkyl silicones from the mixtures of the respective mono- and di-alkyl silicols.

Another object is to separate a dialkyl silicone from a copolymer containing a monoalkyl silicon oxide.

Another object is to produce pure dimethyl silicone.

Another object is to produce polymeric di-methyl silicone which is substantially free from monomethyl silicon oxide.

Another object is to prepare dimethyl silicone from a mixture of mono- and di-methyl silicols in a simple and efficient manner without loss or contamination of the silicone.

Another object is to separate dimethyl silicone from mixtures and copolymers of dimethyl silicone with the monoalkyl or monoaryl silicon oxides.

Another object is to separate dimethyl silicone from a resinous copolymer containing mono- and di-methyl silicon oxides.

Another object is to isolate low molecular weight polymers of dimethyl silicone from the higher polymers thereof.

Another object is to convert insoluble polymers of dimethyl silicone into soluble polymers thereof.

To these and other ends this invention comprises the methods and products resulting therefrom to be hereinafter more fully described and claimed.

Hitherto there has been no wholly suitable, that is, no economically practical and commercially adaptable, method for preparing dimethyl silicone and it has not been possible to separate it from copolymers and mixtures containing monomethyl silicon oxide or other mono-organo silicon oxides. In my copending application, Serial No. 353,302, filed August 19, 1940, now U. S. Patent 2,371,050, dated March 6, 1945, of which this application is a continuation in part, I have shown that dimethyl silicone can be prepared by hydrolyzing dimethyl silicon dichloride as follows: The latter compound is obtained by the Grignard reaction on silicon tetrachloride which produces a mixture of methyl silicon chlorides in accordance with the following reactions:

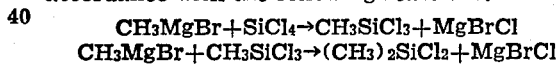

The dimethyl silicon dichloride is then separated from the mixture of chlorides and purified by fractional distillation. The purified product is hydrolyzed by pouring it into an excess of water, preferably kept cold, and the silicone is formed by a spontaneous condensation of the diol or hydrolysis product

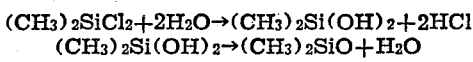

the two reactions probably, to some extent at least, occurring simultaneously. The separation of the dimethyl silicon dichloride from the monomethyl silicon trichloride by fractional distillation is extremely difficult because the boiling points of the two compounds are 70° C. at 745 mm. and 67.5° C. at 738 mm. respectively, and it is necessary to rectify them repeatedly with a highly efficient fractionating column. In my copending application above referred to, I found it advantageous to hydrolyze the mixture of chlorides resulting from the Grignard reaction and to produce thereby a copolymeric mixture containing the mono- and di-methyl silicon polymers.

Although a variation in the molar proportions of the reactants in the above-described Grignard reaction will cause a variation in the relative proportions of the methyl silicon chlorides which are formed, a mixture thereof, probably also containing some unreacted silicon tetrachloride, will always result. The hydrolysis of such a mixture of chlorides results in a mixture of the corresponding silicols or hydroxy compounds which readily condense with loss of water and the resulting product is not dimethyl silicone but is a copolymeric mixture containing mono-, di- and unsubstituted silicon atoms. It has not heretofore been possible to separate such a mixture and to obtain therefrom the dimethyl silicone per se.

I have now discovered a simple and efficient method of preparing dimethyl silicone and other lower dialkyl silicones from the mixed hydrolysis products referred to above and from the polymeric mixtures resulting from the condensation and dehydration of such hydrolysis products. The method is applicable for the recovery or separation of low polymers of dimethyl silicone or other alkyl silicones from insoluble polymers thereof and from their polymeric mixtures with mono-organo silicon oxides in general. I have discovered that when high polymers of dimethyl silicone are heated to suitable temperatures the siloxane linkages, by which the structural units are bound, are capable of rearrangement, making depolymerization possible. Thus highly polymerized dimethyl silicone is depolymerized by heating it to about 275° C. to 300° C. or above, and thereby is converted from high molecular weight to low molecular weight polymers having sufficiently low boiling points to permit their distillation. The mono-organo silicon oxides, on the other hand, become highly polymerized by heat to a solid undistillable residue. However, during depolymerization and distillation of the silicone noticeable amounts of both mono- and unsubstituted silicon, if present, may also be carried over with the distillate. This is more noticeable and hence objectionable when the method is applied to fresh hydrolysis products or incompletely condensed mixtures and makes a redistillation necessary in order to obtain complete separation of the silicone. I have found that the introduction into the still of a small amount of a preferably solid caustic alkali such as sodium hydroxide before distillation will overcome the difficulty and the silicone may thus be distilled uncontaminated.

The dimethyl silicone produced by my method is an oily liquid which is immiscible with water but soluble in organic solvents. The identity and purity of the dimethyl silicone is clearly and positively established by analytical determinations of the silicon content as $SiO_2$, the accuracy of which far exceeds the accuracy of known methods for the determination of carbon and hydrogen. To determine the silicon content, that is, the $SiO_2$ equivalent, I weigh the sample in a test tube composed of fused quartz. The sample is then cautiously decomposed with repeated additions of nitric acid and heating to oxidize and drive off all organic matter after which the residual pure silica is ignited to constant weight and its percentage of the sample is calculated. Since the entire determination is carried out in one container without loss or attrition of the sample, the method has proved to be highly accurate and the experimental error does not exceed about 0.05%. The $SiO_2$ equivalent to the theoretical silicon content of dimethyl silicone is 81.08% $SiO_2$, and repeated analyses of distillates obtained by my methods have given values so consistently close to the theoretical as to leave no doubt that the distillate contains two methyl groups per silicon atom and corresponds to the formula $(CH_3)_2SiO$. It is a mixture of numerous polymers, the two lowest or simplest of which I have isolated and identified, as will be shown.

The other lower alkyl silicones, including ethyl, propyl, butyl and amyl, can be prepared in a similar manner by distilling the hydrolysis products of the respective substituted silicon chlorides resulting from the reactions of ethyl, propyl, butyl and amyl or other low alkyl Grignard reagents on silicon tetrachloride analogous to those recited above for the methyl Grignard reagent.

The following examples will illustrate the invention:

*Example I*

A mixture of the methyl silicon chlorides is prepared by the Grignard reaction, for instance, by slowly adding an ether solution of magnesium methyl bromide to an ether solution of silicon tetrachloride in the proportion two mols of the Grignard to one mol of the silicon tetrachloride, the reaction mixture preferably being suitably cooled to prevent rise of temperature above 20° C. The resulting mixture of chlorides is hydrolyzed to form the corresponding silicols, preferably by pouring it into ice water. The ether layer which contains the condensation products may be washed, if desired, to remove magnesium salts and hydrochloric acid formed during hyrolysis and the ether is recovered by distillation or by evaporation under reduced pressure. The product is a mobile liquid comprising mono- and di-methyl hydroxy compounds and condensation products with a possible trace of the trimethyl compound. The latter, if present, does not interfere with the subsequent separation of the silicone.

The mixture of hydrolysis products remaining after the evaporation of the ether is placed in a still, preferably with addition of about .1% of solid NaOH, and heated. Distillation of the silicone begins at about 135° C. and a partially crystalline distillate collects which is composed of low molecular weight polymers having a cyclic structure. The average molecular weight of the distillate increases with the temperature of distillation. In the neighborhood of 275° C., when about one-fifth of the initial mixture has distilled, the remaining higher polymers which may have formed during heating begin to depolymerize and the average molecular weight of the distillate ceases to increase. As stronger heat is applied, the temperature of the contents of the still can be increased nearly to red heat without substantially increasing the temperature at which the vapor condenses. Under these conditions depolymerization and rate of distillation become very rapid. The distillate comprises substantially all of the silicone but unless caustic alkali were introduced it is preferable to redistill it with caustic.

On redistillation I have found that low polymers of dimethyl silicone, having definite melting and boiling points, can be separated by fractionation. In this manner I have separated what I believe to be the lowermost polymer which melts at about 65.5° C. and boils at about 135° C. under atmospheric pressure. This material by analysis has a silicon content equivalent to 81.07% $SiO_2$. A determination of the molecular weight by the freezing point method gives the value 223. The trimer $[(CH_3)_2SiO]_3$, has a theoretical molecular weight of 222. Since the only possible structure which conforms to this data is a heterocyclic ring, this is strong evidence that this polymer has the structure

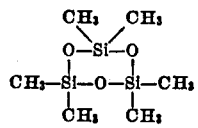

This polymer is crystalline at room temperature and forms flat hexagonal plates which are soluble in organic solvents.

In like manner I have separated another polymer having the following composition and properties as measured: silicon equivalent to 81.1% $SiO_2$, melting point 18° C., boiling point 170° C., under atmospheric pressure, and molecular weight 290. The theoretical molecular weight of the cyclic tetramer is 296. Therefore, this polymer has the structure

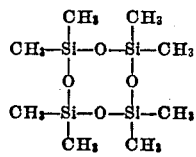

At this point it should be mentioned that the above described process is conducted in the substantial absence of air or oxygen. The air which is initially present in the still and condenser is substantially eliminated by expansion and by the sweeping action of the vapors as soon as distillation begins. Exposure of the silicone to air when heated at about 200°–250° C. as by bubbling a stream of air therethrough results in the oxidation and removal of some of the methyl groups, that is, forms some of the monomethyl compound, which causes copolymerization as described in my copending application Serial Number 353,302, now U. S. Patent No. 2,371,050, above referred to. Inasmuch as this invention is not concerned with the production of copolymers but aims at the production of the silicone and its separation from the copolymer, it is desirable to prevent such oxidation which may unduly decrease the available amount of silicone and increase the amount of the monomethyl compound in the still residue.

*Example II*

40.9 grams of a copolymer which was an insoluble gel composed of 40 mol per cent of dimethyl silicone and 60 mol per cent of monomethyl silicon oxide was gradually heated in a distilling flask up to a dull red heat. The distillate was composed of low polymers of dimethyl silicone and amounted to 18 grams. The calculated amount of silicone present in the original copolymeric gel was 17.2 grams. The monomethyl polymer remained in the still as an infusible granular residue.

*Example III*

Diethyl silicon dichloride was prepared by the Grignard reaction analogous to that described above for the preparation of dimethyl silicon dichloride. The ethyl silicon chlorides composed principally of diethyl silicon dichloride were hydrolyzed by the addition of water and, since the reaction was relatively slow, the mixture was allowed to stand at room temperature overnight. The resulting oily liquid was washed with water and dried under vacuum. It was then distilled under atmospheric pressure, the temperature finally attaining 385° C., at which time a small partly solid residue remained in the still composed chiefly of the monoethyl polymer. On redistillation practically the entire product came over with little change in the amounts of the various fractions up to 380° C. showing that no substantial depolymerization occurred on the second distillation. The distillate was a clear mobile liquid from which no polymers having crystalline characteristics or definite boiling points could be separated by fractionation.

*Example IV*

The distillate from Example III consisting of diethyl silicone was polymerized by heating at 200° C. for 28 hours during which time a stream of air was bubbled through it. This treatment oxidized and eliminated some of the ethyl groups as was evident from the odor of aldehyde and the resulting highly viscous product had therefore become a copolymer of the mono- and diethyl compounds. The viscous copolymer was then distilled and about one-fourth of its volume came over as an oil closely resembling the original oily silicone. In the still a brittle residual mass remaining on cooling.

*Example V*

A copolymer of dimethyl silicone containing unsubstituted silicon atoms was prepared by hydrolyzing a mixture of dimethyl silicon diethoxide and ethyl orthosilicate and dehydrating the hydrolysis product by heat until an insoluble gel was obtained. The gel was then heated in a flask and in the neighborhood of 275° C. it began to liquify and the liquid distilled off. Heating was continued and the temperature increased until no further liquification took place and a foamy solid residue of silica remained in the flask. To ensure complete separation about 0.1 gram of solid sodium hydroxide was added to the thinly fluid distillate and it was redistilled. A small foamy residue of silica remained and the final distillate was pure dimethyl silicone, corresponding in amount to the calculated amount initially present.

*Example VI*

A copolymer comprising 1.45 and 5.15 parts by weight of monophenyl- and dimethyl-silicon oxides respectively and consisting of a thermoplastic solid was placed in a flask and heated. Depolymerization and distillation occurred with a boiling range of 140°–350° C. The distillate was liquid at room temperature and amounted to about 1.5 parts by weight. It was identified as dimethyl silicone.

*Example VII*

Highly polymerized insoluble dimethyl silicone can by my method be converted to lower soluble polymers. For example, pure dimethyl silicone comprising an insoluble rubbery gel and showing by analysis 81.10% SiO₂ was heated in a flask up to 400°–500° C. The rubbery material progressively liquified and the liquid distilled until substantially nothing was left in the flask. The partly crystalline and partly liquid distillate was identified as low polymers of dimethyl silicone.

*Example VIII*

Liquid dibutyl silicone was heated in air for 25 hours at 180°–200° C. during which time a slow stream of air was bubbled through it in order to form a copolymer of mono- and di-butyl silicon oxides. The viscosity of the liquid gradually increased due to the oxidation and elimination of some butyl radicles and the formation of monobutyl silicon oxide combined as a copolymer with the silicone. A small amount of powdered NaOH was added and the mixture was heated in a distilling flask. Liquid dibutyl silicone was distilled and a solid residue remained in the flask. The viscosities of the liquid before and after distillation were compared by measuring the times required for a definite quantity thereof to flow from a given pipette. The time of flow for the liquid distillate was 0.6 second as compared with 23.0 seconds required by the more viscous oxidized copolymer.

*Example IX*

Liquid diamyl silicone was heated in air for 25 hours at 180°–200° C. during which time a slow stream of air was bubbled through it in order to form a copolymer of mono- and di-amyl silicon oxides. The viscosity of the liquid gradually increased due to the oxidation and elimination of some amyl radicles and the formation of monoamyl silicon oxide combined as a copolymer with the silicone. A small amount of powdered NaOH was added and the mixture was heated in a distilling flask. Liquid diamyl silicone was distilled and a solid residue remained in the flask. The viscosities of the liquid before and after distillation were compared by measuring the times required for a definite quantity thereof to flow from a given pipette. The time of flow for the liquid distillate was 1.4 seconds as compared with 281.0 seconds required by the more viscous oxidized copolymer.

*Example X*

Dibutyl diethoxy silicon and mono-methyl triethoxy silicon in the molar ratio 4/3 were mixed and dissolved in dioxan to form a 50% solution by volume. Hydrolysis and copolymerization were effected by the slow addition of an aqueous solution of dioxan containing a trace of HCl as catalyst. The solvent and water were then removed at room temperature by subjecting the solution to reduced pressure. The resulting copolymer was heated in a distilling flask at atmospheric pressure. At first some water was evolved and when the temperature had mounted to about 378° C. dibutyl silicone began to distill and continued until when the temperature of the vapor was in the neighborhood of 400° C. the residual contents of the flask solidified. Distillation then practically ceased and the residue comprised monomethyl silicon oxide and decomposition products of dibutyl silicone, probably the monobutyl silicon oxide.

From the above it will be seen that my invention provides a convenient method for the preparation of pure alkyl silicones and also makes possible the recovery or separation thereof from highly polymerized insoluble products consisting of or containing them. The low polymeric forms of dimethyl silicone which are obtainable by my method can easily be polymerized to give useful products by treating them with a catalyst such as hydrochloric acid and heating them. When polymerized to a sufficient extent dimethyl silicone becomes a flexible, insoluble product which provides an excellent coating and impregnating material for fabrics, or for binding fibrous and pulverulent materials or as a protective or insulating coating for metals, enamels, glass, stone, concrete and the like. For coating compositions the polymers may be dissolved in a suitable solvent such as benzene, toluene, etc., and the solution employed for coating various articles and materials. The coating after evaporation of the solvent can be polymerized in situ to an insoluble, flexible composition which is chemically inert, has desirable electrical properties rendering it suitable for electrical insulation and is relatively heat resistant.

What I claim is:

1. A polymer of dimethyl silicone having the formula $[(CH_3)_2SiO]_n$ where $n$ represents an integer from 3 to 4 inclusive.
2. Cyclic trimer of dimethyl silicone.
3. Cyclic tetramer of dimethyl silicone.

JAMES FRANKLIN HYDE.

REFERENCES CITED

The following references are of record in the file of this patent:

UNITED STATES PATENTS

| Number | Name | Date |
| --- | --- | --- |
| 2,258,218 | Rochow | Oct. 17, 1941 |
| 2,258,219 | Rochow | Oct. 17, 1941 |
| 2,258,220 | Rochow | Oct. 17, 1941 |
| 2,258,222 | Rochow | Oct. 17, 1941 |

OTHER REFERENCES

Beilstein: "Handbuch der Org. Chem.," 4th ed., vol. IV, pages 628–629.

Kipping et al.: "Jour. Chem. Soc.," 1901, pages 449–456; ibid., 1908, pages 449; ibid., 1909, pages 302, 313; ibid., 1911, pages 138–144; ibid., vol. 107, page 459.

Taurke: "Berichte," vol. 38, pages 1665–6.